US012125442B2

(12) United States Patent
An et al.

(10) Patent No.: US 12,125,442 B2
(45) Date of Patent: Oct. 22, 2024

(54) DRIVING CONTROLLER, DISPLAY DEVICE, AND OPERATION METHOD OF THE DISPLAY DEVICE

(71) Applicant: Samsung Display Co., LTD., Yongin-si (KR)

(72) Inventors: Byoungkwan An, Yongin-si (KR); Joonhyeok Jeon, Yongin-si (KR); Sangmyeon Han, Yongin-si (KR); Seungho Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/379,323

(22) Filed: Oct. 12, 2023

(65) Prior Publication Data

US 2024/0221671 A1 Jul. 4, 2024

(30) Foreign Application Priority Data

Jan. 4, 2023 (KR) ........................ 10-2023-0001366

(51) Int. Cl.
*G09G 3/3258* (2016.01)

(52) U.S. Cl.
CPC ... *G09G 3/3258* (2013.01); *G09G 2320/0242* (2013.01); *G09G 2320/0276* (2013.01); *G09G 2320/041* (2013.01); *G09G 2320/043* (2013.01); *G09G 2320/0626* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 10,210,797 | B2 | 2/2019 | Lee et al. | |
| 11,049,444 | B2 | 6/2021 | Kim et al. | |
| 11,056,053 | B2 | 7/2021 | Lee et al. | |
| 2017/0069261 | A1* | 3/2017 | Lee | G09G 3/3208 |
| 2020/0058251 | A1* | 2/2020 | Lee | G09G 3/3225 |
| 2020/0312235 | A1* | 10/2020 | Kim | G09G 3/3275 |
| 2022/0036834 | A1 | 2/2022 | Han et al. | |

FOREIGN PATENT DOCUMENTS

| | | | |
|---|---|---|---|
| KR | 1020200021012 | A | 2/2020 |
| KR | 102280095 | B1 * | 7/2021 |
| KR | 1020220017021 | A | 2/2022 |
| KR | 102400138 | B1 | 5/2022 |

* cited by examiner

*Primary Examiner* — Kirk W Hermann
(74) *Attorney, Agent, or Firm* — CANTOR COLBURN LLP

(57) ABSTRACT

A driving controller of a display device includes: an accumulation unit, which outputs accumulation data, which is obtained by accumulating a deterioration state, and a deterioration stress value based on an input image signal and a deterioration prediction temperature value; a temperature prediction unit that calculates the deterioration prediction temperature value based on the accumulation data, a color acceleration coefficient, a color current contribution ratio, and a temperature signal; and a compensation unit that outputs an output image signal based on the input image signal and the deterioration stress value.

20 Claims, 9 Drawing Sheets

FIG. 8

| Image Pattern | Grayscale | Acceleration Coefficient | Change Amount | Luminance | Current Contribution Ratio | Y_W | Predicted Temperature Deviation(℃) |
|---|---|---|---|---|---|---|---|
| R Pattern | 223 | 1.82 | 599 | 190 | 398 | 74 | 8.42 |
| G Pattern | 255 | 1.74 | 1024 | 255 | 306 | 76 | 8.31 |
| B Pattern | 253 | 1.71 | 994 | 251 | 319 | 78 | 8.53 |
| W Pattern | 151 | R: 1.82 | 126 | 80 | 398 | 74 | 8.75 |
| | | G: 1.74 | 138 | 80 | 306 | 76 | |
| | | B: 1.71 | 143 | 80 | 319 | 78 | |

DRIVING CONTROLLER, DISPLAY DEVICE, AND OPERATION METHOD OF THE DISPLAY DEVICE

This application claims priority under to Korean Patent Application No. 10-2023-0001366 filed on Jan. 4, 2023, and all the benefits accruing therefrom under 35 U.S.C. § 119, the content of which in its entirety is herein incorporated by reference.

BACKGROUND

Embodiments of the present disclosure described herein relate to a display device.

An electronic device, which provides images to users, such as a smart phone, a digital camera, a notebook computer, a navigation system, a monitor, and a smart television includes a display device for displaying the images. The display device generates an image and provides the users with the generated image through a display screen.

The display device includes a plurality of pixels and driving circuits for controlling the plurality of pixels. Each of the plurality of pixels includes a light emitting element and a pixel circuit for controlling the light emitting element. The pixel circuit may include a plurality of transistors organically connected to one another.

This display device may display an image by outputting a scan signal to a scan line connected to a pixel to be displayed and providing a data line connected to the pixel with a data voltage corresponding to the image to be displayed.

As a usage period increases, the light emitting element in the pixel may deteriorate. When the light emitting element deteriorates, more driving current is required to display light with the same luminance.

SUMMARY

Embodiments of the present disclosure provide a display device capable of accurately calculating the deterioration degree of a pixel.

According to an embodiment, a driving controller includes: an accumulation unit that outputs accumulation data and a deterioration stress value based on an input image signal and a deterioration prediction temperature value, a temperature prediction unit that calculates the deterioration prediction temperature value based on the accumulation data, a color acceleration coefficient, a color current contribution ratio, and a temperature signal, and a compensation unit that outputs an output image signal based on the input image signal and the deterioration stress value. The temperature prediction unit extracts a color change amount based on the accumulation data and the color acceleration coefficient, calculates color luminance based on the color change amount and the color acceleration coefficient, calculates a total current based on the color luminance and a color current contribution ratio, and calculates the deterioration prediction temperature value based on the total current and the temperature signal.

In an embodiment, the temperature prediction unit may include a change amount extraction unit that extracts the color change amount based on the accumulation data and the color acceleration coefficient, a luminance calculation unit that calculates the color luminance based on the color change amount and the color acceleration coefficient, a total current calculation unit that calculates the total current based on the color luminance and the color current contribution ratio, and a deterioration temperature prediction unit that calculates the deterioration prediction temperature value based on the total current and the temperature signal.

In an embodiment, the accumulation data may include first color accumulation data, second color accumulation data, and third color accumulation data. The color acceleration coefficient may include a first color acceleration coefficient, a second color acceleration coefficient, and a third color acceleration coefficient. The change amount extraction unit may calculate a first color change amount based on the first color accumulation data and the first color acceleration coefficient, may calculate a second color change amount based on the second color accumulation data and the second color acceleration coefficient, and may calculate a third color change amount based on the third color accumulation data and the third color acceleration coefficient.

In an embodiment, the color acceleration coefficient may include a first color acceleration coefficient, a second color acceleration coefficient, and a third color acceleration coefficient. The luminance calculation unit may calculate first color luminance based on the first color change amount and the first color acceleration coefficient, may calculate second color luminance based on the second color change amount and the second color acceleration coefficient, and may calculate third color luminance based on the third color change amount and the third color acceleration coefficient.

In an embodiment, the color current contribution ratio may include a first color current contribution ratio, a second color current contribution ratio, and a third color current contribution ratio. The total current calculation unit may calculate a first current based on the first color luminance and the first color current contribution ratio, may calculate a second current based on the second color luminance and the second color current contribution ratio, and may calculate a third current based on the third color luminance and the third color current contribution ratio. The total current calculation unit may calculate the total current based on the first current, the second current, and the third current.

In an embodiment, the total current calculation unit may calculate an average of the first current, the second current, and the third current as the total current.

In an embodiment, the deterioration temperature prediction unit may predict a temperature deviation based on the total current and may calculate the deterioration prediction temperature value based on the predicted temperature deviation and the temperature signal.

According to an embodiment, a display device includes: a display panel including a plurality of pixels divided into a plurality of blocks: a temperature sensor that senses ambient temperature and to output a temperature signal corresponding to the sensed ambient temperature; and a driving controller that provides the display panel with an output image signal obtained by compensating for the input image signal based on an input image signal and the temperature signal. The driving controller includes: a block accumulation unit, which outputs accumulation data and a deterioration stress value of each of the plurality of blocks based on the input image signal and a deterioration prediction temperature value: a block temperature prediction unit that calculates the deterioration prediction temperature value based on the accumulation data, a color acceleration coefficient, a color current contribution ratio, and the temperature signal; and a compensation unit that outputs the output image signal based on the input image signal and the deterioration stress value.

In an embodiment, the block temperature prediction unit may include a change amount extraction unit that extracts a color change amount based on the accumulation data and the color acceleration coefficient, a luminance calculation unit that calculates color luminance based on the color change amount and the color acceleration coefficient, a total current calculation unit that calculates a total current based on the color luminance and a color current contribution ratio, and a deterioration temperature prediction unit that calculates the deterioration prediction temperature value based on the total current and the temperature signal.

In an embodiment, the accumulation data may include first color accumulation data, second color accumulation data, and third color accumulation data. The color acceleration coefficient may include a first color acceleration coefficient, a second color acceleration coefficient, and a third color acceleration coefficient. The change amount extraction unit may calculate a first color change amount based on the first color accumulation data and the first color acceleration coefficient, may calculate a second color change amount based on the second color accumulation data and the second color acceleration coefficient, and may calculate a third color change amount based on the third color accumulation data and the third color acceleration coefficient.

In an embodiment, the change amount extraction unit calculates the first color change amount based on Equation 1 of $$D\_R = \left(\frac{ACD\_R}{255}\right)^{2.2 \times ACC\_R} \times 1024,$$

where D_R denotes the first color change amount, ACD_R denotes the first color accumulation data, ACC_R denotes the first color acceleration coefficient, 2.2 is a gamma correction coefficient, 255 denotes a maximum grayscale value, and 1024 denotes a maximum value of the first color change amount.

In an embodiment, the color acceleration coefficient may include a first color acceleration coefficient, a second color acceleration coefficient, and a third color acceleration coefficient. The luminance calculation unit may calculate first color luminance based on the first color change amount and the first color acceleration coefficient, may calculate second color luminance based on the second color change amount and the second color acceleration coefficient, and may calculate third color luminance based on the third color change amount and the third color acceleration coefficient.

In an embodiment, the luminance calculation unit calculates the first color luminance based on Equation 2 of $$Y\_R = \left(\frac{D\_R}{1024}\right)^{(1/ACC\_R)} \times 255,$$

where Y_R denotes the first color luminance, D_R denotes the first color change amount, ACC_R denotes the first color acceleration coefficient, 1024 denotes a maximum value of the first color change amount, and 255 denotes a maximum grayscale value.

In an embodiment, the color current contribution ratio may include a first color current contribution ratio, a second color current contribution ratio, and a third color current contribution ratio. The total current calculation unit may calculate a first current based on the first color luminance and the first color current contribution ratio, may calculate a second current based on the second color luminance and the second color current contribution ratio, and may calculate a third current based on the third color luminance and the third color current contribution ratio. The total current calculation unit may calculate the total current based on the first current, the second current, and the third current.

In an embodiment, the total current calculation unit calculates the first current based on Equation 3 of $$Y1 = Y\_R \times \left(\frac{CCR\_R}{1023}\right),$$

denotes Y1 denotes the first current, Y_R denotes the first color luminance, CCR_R denotes the first color current contribution ratio, and 1023 is a sum of the first color current contribution ratio, the second color current contribution ratio and the third color current contribution ratio.

In an embodiment, the total current calculation unit may calculate an average of the first current, the second current, and the third current as the total current.

In an embodiment, the deterioration temperature prediction unit may predict a temperature deviation based on the total current and may calculate the deterioration prediction temperature value based on the predicted temperature deviation and the temperature signal.

According to an embodiment, an operating method of a display device for outputting an output image signal based on an input image signal and a temperature signal includes: extracting a color change amount based on accumulation data, which is calculated based on the input image signal, and a color acceleration coefficient, calculating color luminance based on the color change amount and the color acceleration coefficient, calculating a total current based on the color luminance and a color current contribution ratio, calculating a temperature deviation based on the total current, and calculating a deterioration prediction temperature value based on the temperature deviation and a temperature signal from a temperature sensor.

In an embodiment, the accumulation data may include first color accumulation data, second color accumulation data, and third color accumulation data. The color acceleration coefficient may include a first color acceleration coefficient, a second color acceleration coefficient, and a third color acceleration coefficient. The extracting of the color change amount may include calculating a first color change amount based on the first color accumulation data and the first color acceleration coefficient, calculating a second color change amount based on the second color accumulation data and the second color acceleration coefficient, and calculating a third color change amount based on the third color accumulation data and the third color acceleration coefficient.

In an embodiment, the color acceleration coefficient may include a first color acceleration coefficient, a second color acceleration coefficient, and a third color acceleration coefficient. The calculating of the color luminance may include calculating first color luminance based on the first color change amount and the first color acceleration coefficient, calculating second color luminance based on the second color change amount and the second color acceleration coefficient, and calculating third color luminance based on the third color change amount and the third color acceleration coefficient.

BRIEF DESCRIPTION OF THE FIGURES

The above and other aspects and features of the present disclosure will become apparent by describing in detail embodiments thereof with reference to the accompanying drawings.

FIG. 8 is a diagram showing a total current and a predicted temperature deviation according to an image pattern.

DETAILED DESCRIPTION

Figure 1:
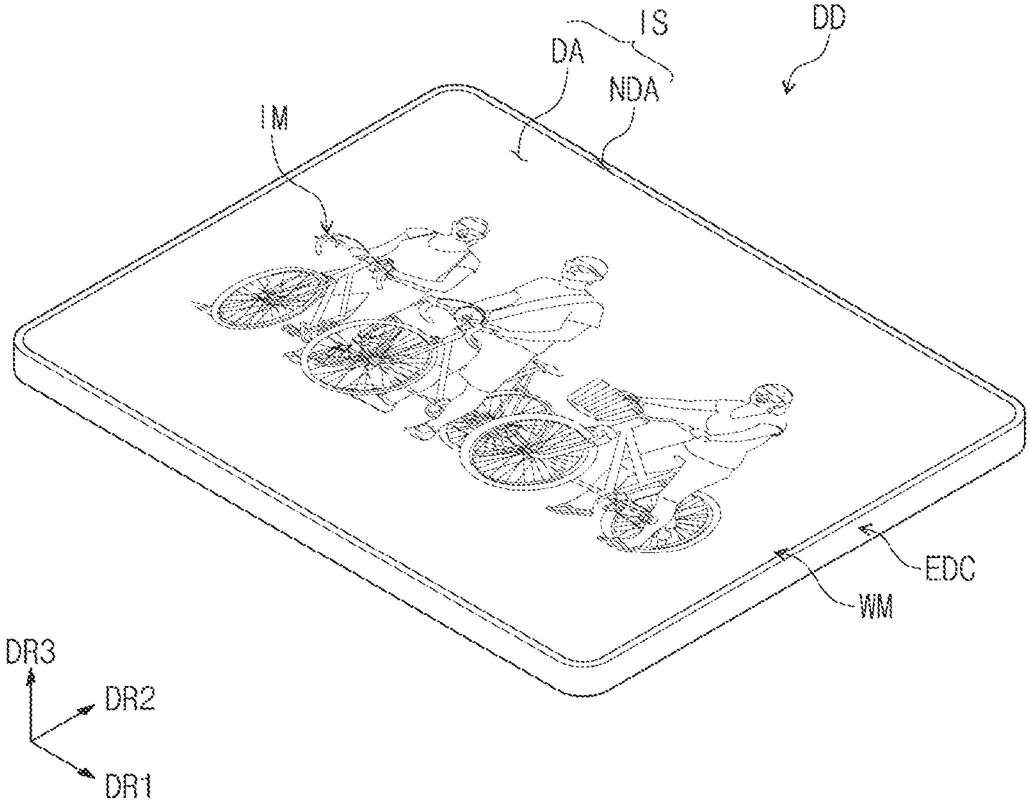
FIG. 1 is a perspective view of a display device, according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
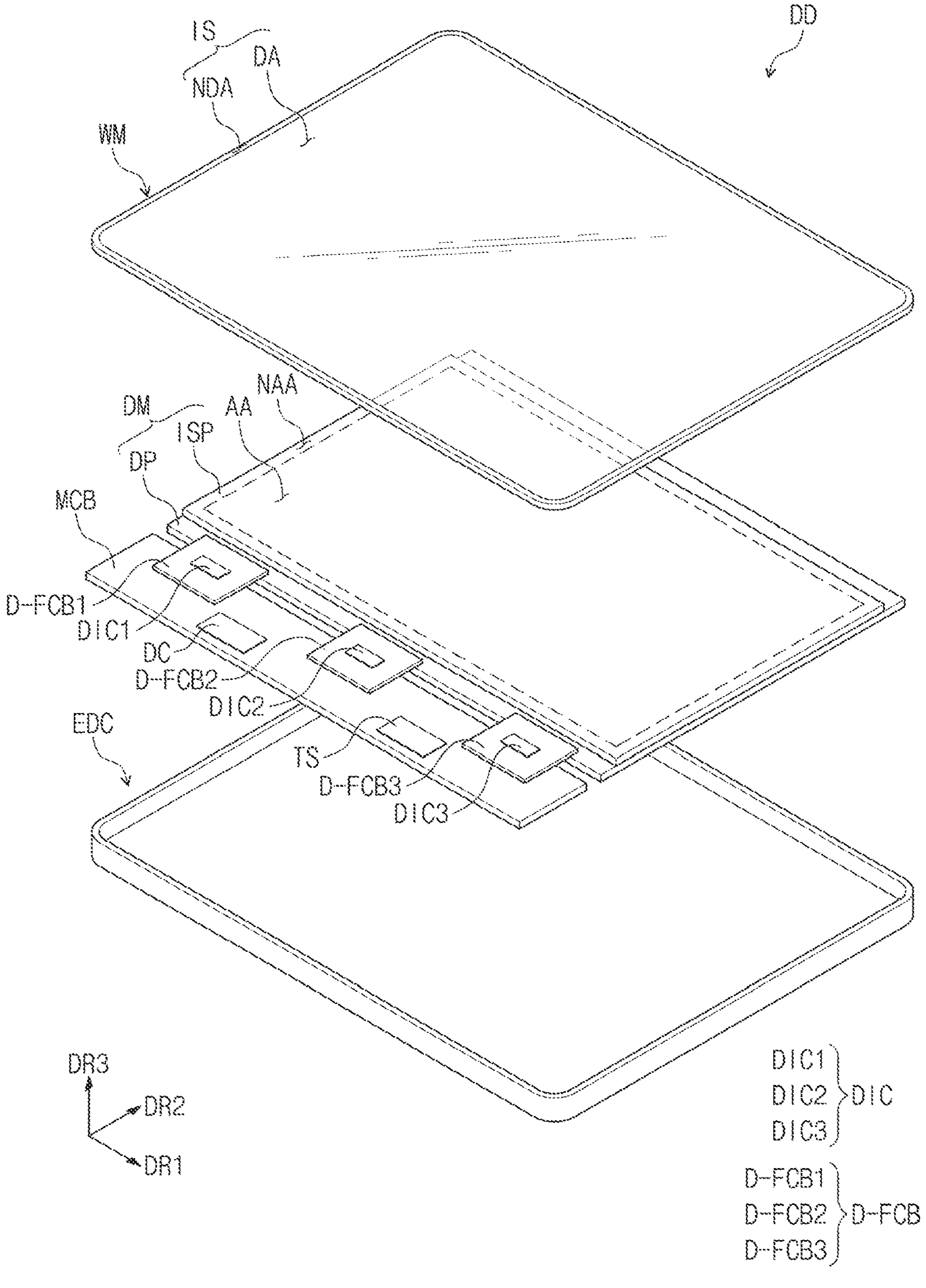
FIG. 2 is an exploded perspective view of a display device, according to an embodiment of the present disclosure.

FIG. 1 is a perspective view of a display device, according to an embodiment of the present disclosure. FIG. 2 is an exploded perspective view of a display device, according to an embodiment of the present disclosure.

Referring to FIGS. 1 and 2, a display device DD may be a device activated depending on an electrical signal. The display device DD according to the present disclosure may be a small and medium-sized electronic device, such as a mobile phone, a tablet PC, a notebook computer, a vehicle navigation system, or a game console, as well as a large-sized electronic device, such as a television or a monitor. The above examples are provided only as examples, and it is obvious that the display device DD may be applied to any other display device(s) without departing from the concept of the present disclosure. The display device DD is in a shape of a rectangle having a long side in the first direction DR1 and a short side in the second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined based on a direction in which the image IM is displayed. The front surface may be opposite to the rear surface in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense an external input of a user, which is applied from the outside. The external input of the user may be one of various types of external inputs, such as a part of his/her body, light, heat, his/her gaze, and pressure, or a combination thereof. Also, the display device DD may sense the external input of the user applied to a side surface or a rear surface of the display device DD depending on a structure of the display device DD and is not limited to an embodiment. As an example of the present disclosure, an external input may include an input entered through an input device (e.g., a stylus pen, an active pen, a touch pen, an electronic pen, or an E-pen).

The display surface IS of the display device DD may be divided into a display area DA and a non-display area NDA. The display area DA may be an area in which the image IM is displayed. A user perceives (or views) the image IM through the display area DA. In an embodiment, the display area DA is illustrated in the shape of a quadrangle whose vertexes are rounded. However, this is illustrated as an example. The display area DA may have various shapes, not limited to an embodiment.

The non-display area NDA is adjacent to the display area DA. The non-display area NDA may have a given color. The non-display area NDA may surround the display area DA.

Accordingly, a shape of the display area DA may be defined substantially by the non-display area NDA. However, this is illustrated as an example. The non-display area NDA may be positioned to be adjacent to only one side of the display area DA or may be omitted. The display device DD according to an embodiment of the present disclosure may include various embodiments and is not limited to an embodiment.

As illustrated in FIG. 2, the display device DD may include a display module DM and a window WM disposed on the display module DM. The display module DM may include a display panel DP and an input sensing layer ISP.

According to an embodiment of the present disclosure, the display panel DP may include a light emitting display panel. In an embodiment, for example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, or the like. Hereinafter, in an embodiment, the description will be given under the condition that the display panel DP is an organic light emitting display panel.

The display panel DP may output the image IM, and the image IM thus output may be displayed through the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP by a subsequent process. That is, when the input sensing layer ISP is directly disposed on the display panel DP, an inner adhesive film (not illustrated) is not interposed between the input sensing layer ISP and the display panel DP. In an embodiment, the inner adhesive film may be interposed between the input sensing layer ISP and the display panel DP. In this case, the input sensing layer ISP is not manufactured together with the display panel DP through the subsequent processes. That is, the input sensing layer ISP may be manufactured through a process separate from a manufacturing process of the display panel DP and may then be fixed on an upper surface of the display panel DP by the inner adhesive film.

The window WM may be formed of or include a transparent material capable of outputting the image IM. In an embodiment, for example, the window WM may be formed of or include glass, sapphire, plastic, etc. It is illustrated that the window WM is implemented with a single layer. However, an embodiment is not limited thereto. In another embodiment, for example, the window WM may include a plurality of layers.

In an embodiment, the window WM may include a light blocking pattern for defining the non-display area NDA. The light blocking pattern that is a colored organic film may be formed, for example, in a coating manner.

The window WM may be coupled to the display module DM through an adhesive film. As an example of the present disclosure, the adhesive film may include an optically clear adhesive ("OCA") film. However, the adhesive film is not limited thereto. In an embodiment, for example, the adhesive film may include a typical adhesive or sticking agent. In another embodiment, for example, the adhesive film may include an optically clear resin ("OCR") or a pressure sensitive adhesive ("PSA") film.

An anti-reflection layer may be further disposed between the window WM and the display module DM. The anti-reflection layer decreases the reflectivity of external light incident from above the window WM. The anti-reflection layer according to an embodiment of the present disclosure may include a phase retarder and a polarizer. The phase retarder may have a film type or a liquid crystal coating type. The polarizer may also be a polarizer of a film type or a liquid crystal coating type. The film type may include a stretch-type synthetic resin film, and the liquid crystal coating type may include liquid crystals arranged in a given direction. The phase retarder and the polarizer may be implemented with one polarization film.

As an example of the present disclosure, the anti-reflection layer may also include color filters. The arrangement of the color filters may be determined in consideration of colors of light generated from a plurality of pixels PX (see FIG. 3) included in the display panel DP. Also, the anti-reflection layer may further include a light blocking pattern.

The display module DM may display the image IM depending on an electrical signal and may transmit/receive information about an external input. The display module DM may be defined by an active area AA and an inactive area NAA. The active area AA may be defined as an area through which the image IM provided from the display area DA is output. Also, the active area AA may be defined as an area in which the input sensing layer ISP senses an external input applied from the outside.

The inactive area NAA is adjacent to the active area AA. In an embodiment, for example, the inactive area NAA may surround the active area AA. However, this is illustrated by way of example. The inactive area NAA may be defined in various shapes, not limited to an embodiment. According to an embodiment, the active area AA of the display module DM may correspond to at least part of the display area DA.

The display module DM may further include a main circuit board MCB, flexible circuit films D-FCB, and driver chips DIC. The main circuit board MCB may be connected to the flexible circuit films D-FCB so as to be electrically connected to the display panel DP. The flexible circuit films D-FCB are connected to the display panel DP so as to electrically connect the display panel DP to the main circuit board MCB.

The display module DM may include a driving controller DC disposed on the main circuit board MCB. The driving controller DC may include circuits for driving the display panel DP. The driver chips DIC may be mounted on the flexible circuit films D-FCB, respectively. In an embodiment, the driving controller DC may include a driving controller for driving the driver chips DIC and a voltage generator that generates voltages for an operation of the display panel DP.

The display module DM may include a temperature sensor TS disposed on the main circuit board MCB. The temperature sensor TS may sense ambient temperature and may provide the sensed temperature to the driving controller DC.

The temperature sensor TS is shown in FIG. 2 disposed on the main circuit board MCB, but the present disclosure is not limited thereto. In another embodiment, the temperature sensor TS may be disposed on a separate circuit board separated from the main circuit board MCB or may be disposed in a predetermined area within an outer case EDC.

As an example of the present disclosure, the flexible circuit films D-FCB may include a first flexible circuit film D-FCB1, a second flexible circuit film D-FCB2, and a third flexible circuit film D-FCB3. The driver chips DIC may include a first driver chip DIC1, a second driver chip DIC2, and a third driver chip DIC3. The first to third flexible circuit films D-FCB1, D-FCB2, and D-FCB3 may be positioned spaced from one another in the first direction DR1 and may be connected with the display panel DP so as to electrically connect the display panel DP and the main circuit board MCB. The first driver chip DIC1 may be mounted on the first flexible circuit film D-FCB1. The second driver chip DIC2 may be mounted on the second flexible circuit film D-FCB2. The third driver chip DIC3 may be mounted on the third flexible circuit film D-FCB3. However, an embodiment of the present disclosure is not limited thereto. In another embodiment, for example, the display panel DP may be electrically connected with the main circuit board MCB through one flexible circuit film, and only one driver chip may be mounted on the one flexible circuit film. Also, the display panel DP may be electrically connected with the main circuit board MCB through four or more flexible circuit films, and driver chips may be mounted on the flexible circuit films, respectively.

A structure in which the first to third driver chips DIC1, DIC2, and DIC3 are mounted on the first to third flexible circuit films D-FCB1, D-FCB2, and D-FCB3, respectively, is illustrated in FIG. 2, but the present disclosure is not limited thereto. In another embodiment, for example, the first to third driver chips DIC1, DIC2, and DIC3 may be directly mounted on the display panel DP. In this case, a portion of the display panel DP, on which the first to third driver chips DIC1, DIC2, and DIC3 are mounted, may be bent such that the first to third driver chips DIC1, DIC2, and DIC3 are disposed on a rear surface of the display module DM. Also, the first to third driver chips DIC1, DIC2, and DIC3 may be directly mounted on the main circuit board MCB.

The input sensing layer ISP may be electrically connected with the main circuit board MCB through the flexible circuit films D-FCB. However, an embodiment of the present disclosure is not limited thereto. That is, the display module DM may additionally include a separate flexible circuit film for electrically connecting the input sensing layer ISP and the main circuit board MCB.

The display device DD further includes the outer case EDC accommodating the display module DM. The outer case EDC may be coupled to the window WM to define an exterior appearance of the display device DD. The outer case EDC may absorb external shocks input from the outside and may prevent a foreign material/moisture or the like from being infiltrated into the display module DM such that components accommodated in the outer case EDC are protected. As an example of the present disclosure, the outer case EDC may be implemented by coupling a plurality of accommodating members.

The display device DD according to an embodiment may further include an electronic module including various functional modules for operating the display module DM, a power supply module (e.g., a battery) for supplying a power for overall operations of the display device DD, a bracket coupled with the display module DM and/or the outer case EDC to partition an inner space of the display device DD, etc.

Figure 3:
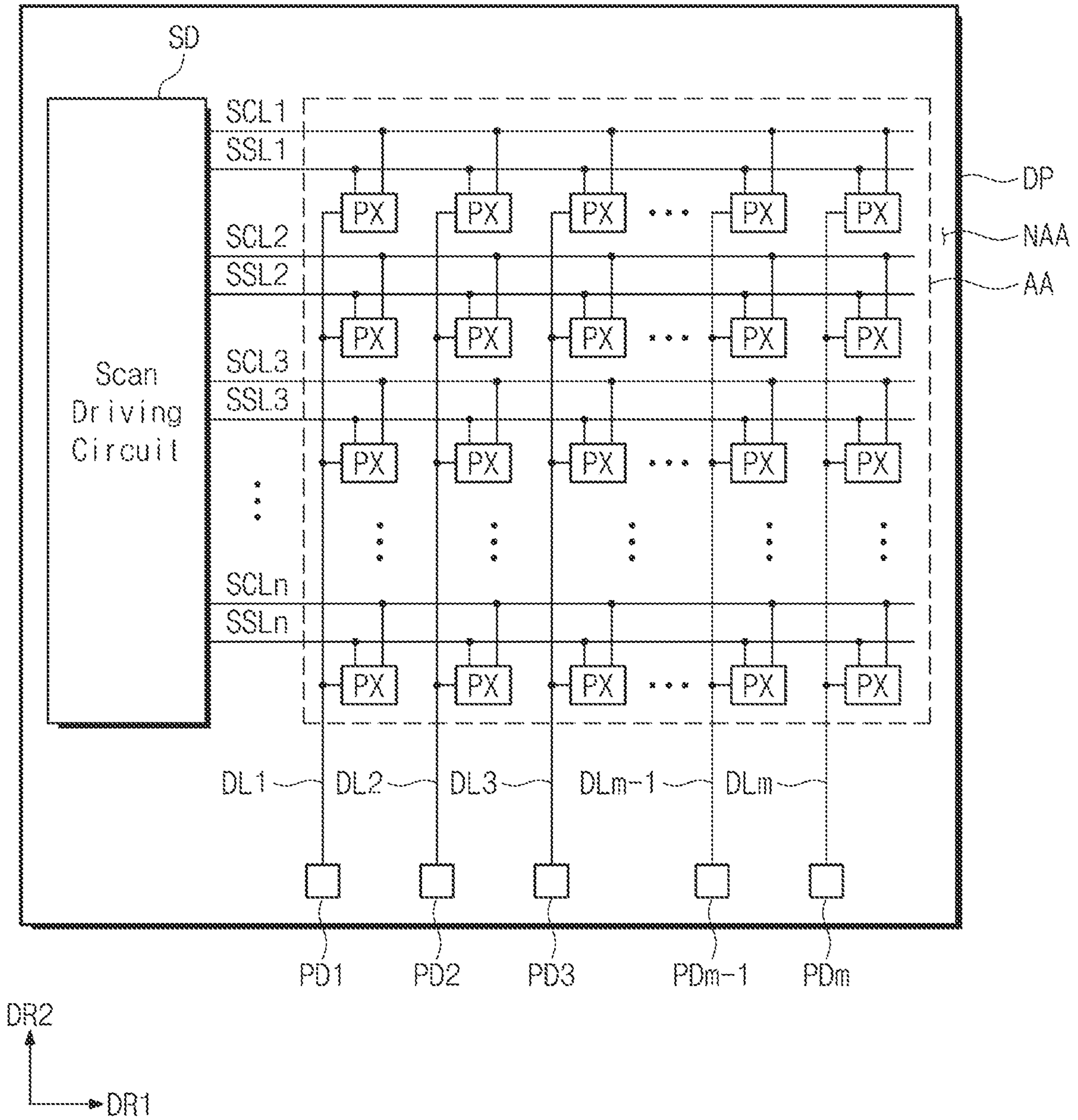
FIG. 3 is a block diagram of a display panel, according to an embodiment of the present disclosure.

FIG. 3 is a block diagram of a display panel, according to an embodiment of the present disclosure.

Referring to FIG. 3, the display panel DP includes first scan lines SCL1 to SCLn, second scan lines SSL1 to SSLn, the data lines DLI to DLm, and pixels PX. The display panel DP may further include a scan driving circuit SD. In an embodiment, the scan driving circuit SD is arranged on a first side of the display panel DP. The first scan lines SCL1 to SCLn and the second scan lines SSL1 to SSLn extend in the first direction DR1 from the scan driving circuit SD.

The scan driving circuit SD may provide first scan signals and second scan signals to the first scan lines SCL1 to SCLn and the second scan lines SSL1 to SSLn of the display panel DP.

The display panel DP may be divided into the active area AA and the inactive area NAA. The pixels PX may be positioned in the active area AA. The scan driving circuit SD may be positioned in the inactive area NAA.

The first scan lines SCL1 to SCLn and the second scan lines SSL1 to SSLn are positioned spaced from each other in the second direction DR2. The data lines DLI to DLm extend in the second direction DR2 and are arranged spaced from one another in the first direction DR1.

The plurality of pixels PX are electrically connected to the first scan lines SCL1 to SCLn, the second scan lines SSL1 to SSLn, and the data lines DLI to DLm. In an embodiment, for example, the first row of pixels PX may be connected to the first scan line SCL1 and the second scan line SSL1. Moreover, the second row of pixels PX may be connected to the first scan line SCL2 and the second scan line SSL2.

Each of the plurality of pixels PX includes a light emitting element ED (see FIG. 4) and a pixel circuit PXC (see FIG. 4) for controlling the emission of the light emitting element ED. The pixel circuit PXC may include a plurality of transistors and at least one capacitor. The scan driving circuit SD may include transistors formed through the same process as the pixel circuit PXC. In an embodiment, the light emitting element ED may be an organic light emitting diode. However, the present disclosure is not limited thereto.

In an embodiment, the scan driving circuit SD is disposed on a first side of the display area DA, but the present disclosure is not limited thereto. In another embodiment, the scan driving circuit SD may be disposed not only on the first side of the active area AA but also on a second side facing the first side.

The display panel DP may further include data pads PD1 to PDm. The data pads PD1 to PDm are electrically connected to the data lines DLI to DLm, respectively. The data pads PD1 to PDm may be electrically connected to the flexible circuit films D-FCB shown in FIG. 2.

Figure 4:
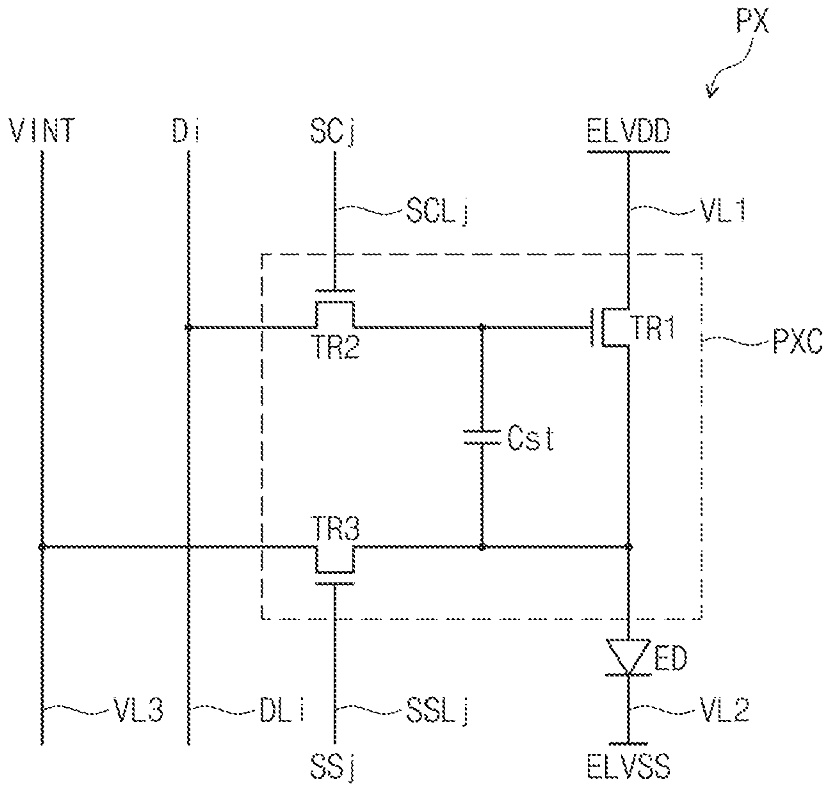
FIG. 4 is a circuit diagram of a pixel, according to an embodiment of the present disclosure.

FIG. 4 is a circuit diagram of a pixel, according to an embodiment of the present disclosure.

FIG. 4 illustrates an equivalent circuit diagram of a pixel PX connected to an i-th data line DLi among the data lines DLI to DLm, a j-th first scan line SCLj among the first scan lines SCL1 to SCLn, and a j-th second scan line SSLj among the second scan lines SSL1 to SSLn, which are illustrated in FIG. 1.

Each of the plurality of pixels PX shown in FIG. 3 may have the same circuit configuration as the pixel PX shown in FIG. 4. In an embodiment, the pixel PX includes the at least one light emitting element ED and the pixel circuit PXC.

The pixel circuit PXC may include at least one transistor, which is electrically connected to the light emitting element ED and which is used to provide a current corresponding to the data signal Di delivered from the data line DLi to the light emitting element ED. In an embodiment, the pixel circuit PXC of the pixel PX includes a first transistor TR1, a second transistor TR2, a third transistor TR3, and a capacitor Cst. Each of the first to third transistors TR1 to TR3 is an N-type transistor by using an oxide semiconductor as a semiconductor layer. However, the present disclosure is not limited thereto. In another embodiment, for example, each of the first to third transistors TR1 to TR3 may be a P-type transistor having a low-temperature polycrystalline silicon ("LTPS") semiconductor layer. In an embodiment, at least one of the first to third transistors TR1 to TR3 may be an N-type transistor and the others thereof may be P-type transistors. Moreover, the circuit configuration of a pixel according to an embodiment of the present disclosure is not limited to FIG. 4. The pixel circuit PXC illustrated in FIG. 4 is only an example. In an embodiment, for example, the configuration of the pixel circuit PXC may be modified and implemented.

Referring to FIG. 4, the first scan line SCLj may deliver the first scan signal SCj, and the second scan line SSLj may deliver the second scan signal SSj. The data line DLi transfers a data signal Di.

A first driving voltage ELVDD and an initialization voltage VINT may be delivered to the pixel circuit PXC through a first voltage line VL1 and a third voltage line VL3, respectively. A second driving voltage ELVSS may be delivered to a cathode (or a second terminal) of the light emitting element ED through a second voltage line VL2.

The first transistor TR1 includes a first electrode (or a drain electrode) connected to the first voltage line VL1, a second electrode (or a source electrode) electrically connected to an anode (or a first terminal) of the light emitting element ED, and a gate electrode connected to one end of the capacitor Cst. When the second transistor TR2 is turned on, the first transistor TR1 may supply a driving current to the light emitting element ED in response to the data signal Di delivered through the data line DLi.

The second transistor TR2 includes a first electrode connected to the data line DLi, a second electrode connected to the gate electrode of the first transistor TR1, and a gate electrode connected to the first scan line SCLj. The second transistor TR2 may be turned on in response to the first scan signal SCj received through the first scan line SCLj so as to deliver the data signal Di delivered through the data line DLi to the gate electrode of the first transistor TR1.

The third transistor TR3 includes a first electrode connected to the third voltage line VL3, a second electrode connected to the anode of the light emitting element ED, and a gate electrode connected to the second scan line SSLj. The third transistor TR3 may be turned on in response to the second scan signal SSj received through the second scan line SSLj so as to deliver the initialization voltage VINT to the anode of the light emitting element ED.

As described above, one end of the capacitor Cst is connected to the gate electrode of the first transistor TR1, and the other end of the capacitor Cst is connected to the second electrode of the first transistor TR1. The structure of the pixel PX according to an embodiment is not limited to the structure illustrated in FIG. 4. The number of transistors in the pixel PX included in the pixel circuit PXC, the number of capacitors included therein, and the connection relationship may be modified in various manners.

Figure 5:
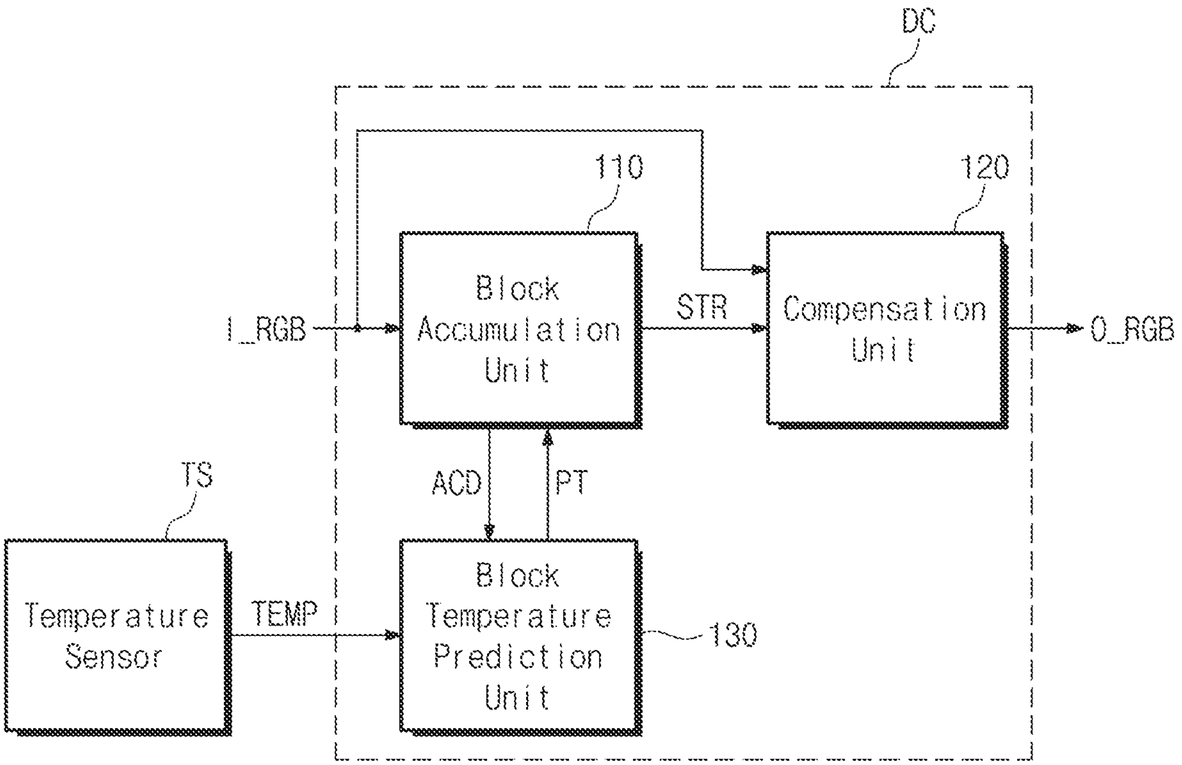
FIG. 5 is a block diagram of a driving circuit, according to an embodiment of the present disclosure.

FIG. 5 is a block diagram of a driving circuit, according to an embodiment of the present disclosure.

Figure 6:
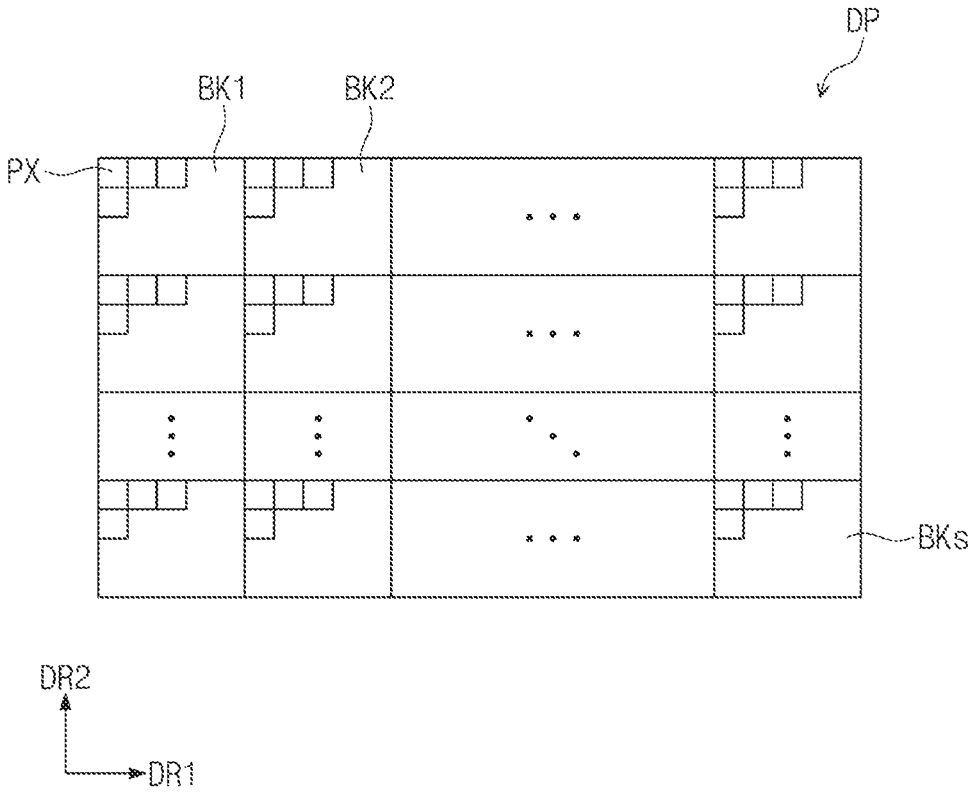
FIG. 6 is a diagram illustrating an example of dividing pixels into a plurality of blocks.

FIG. 6 is a diagram illustrating an example of dividing pixels into a plurality of blocks.

Referring to FIGS. 5 and 6, the driving controller DC may receive an input image signal I_RGB provided from the outside (e.g., an application processor, a graphics processor, or the like) and may receive a temperature signal TEMP from the temperature sensor TS. The driving controller DC outputs an output image signal O_RGB based on the input image signal I_RGB and the temperature signal TEMP.

The driving controller DC includes a block accumulation unit 110, a compensation unit 120, and a block temperature prediction unit 130.

The block accumulation unit 110 may divide the plurality of pixels PX of the display panel DP into a plurality of blocks BK1 to BKs and may calculate accumulation data ACD based on each of the input image signal I_RGB of each of the blocks BK1 to BKs (here, 's' is a positive integer greater than 1).

In an embodiment, each of the blocks BK1 to BKs may include the 'X' pixels PX arranged in the first direction DR1 and the 'Y' pixels PX arranged in the second direction DR2 (here, each of 'X' and 'Y' is a positive integer).

The number(s) of the blocks BK1 to BKs of the display panel DP may be determined depending on the total number of pixels PX arranged in the display panel DP and the number of pixels included in each of the blocks BK1 to BKs.

When the number of the blocks BK1 to BKs is the same as the total number of pixels PX, accurate deterioration compensation may be achieved, but data storage and calculation costs increase.

When each of the blocks BK1 to BKs includes two or more pixels PX (i.e., when the number of the blocks BK1 to BKs is less than the total number of pixels PX), the data storage and calculation costs decrease, but accurate deterioration compensation may not be achieved. The manufacturer of the display device DD may determine a size of the blocks BK1 to BKs (i.e., X×Y) in consideration of a trade-off relationship.

In an embodiment, the block accumulation unit 110 calculates a representative value of each of the blocks BK1 to BKs based on the input image signal I_RGB. The block accumulation unit 110 outputs the accumulation data ACD corresponding to each of the blocks BK1 to BKs based on the representative value of each of the blocks BK1 to BKs. The accumulation data ACD may be provided to the block temperature prediction unit 130.

The block temperature prediction unit 130 calculates a deterioration prediction temperature value PT based on the accumulation data ACD provided from the block accumulation unit 110 and the temperature signal TEMP provided from the temperature sensor TS. The deterioration prediction temperature value PT may be provided to the accumulation unit 110. In an embodiment, the block temperature prediction unit 130 may output the deterioration prediction temperature value PT corresponding to each of the blocks BK1 to BKs.

The block accumulation unit 110 calculates the accumulation data ACD and a deterioration stress value STR of each of the blocks BK1 to BKs based on the accumulation data ACD, which are previously accumulated, and the deterioration prediction temperature value PT provided from the block temperature prediction unit 130. In an embodiment, the deterioration stress value STR may have a different value for each of the blocks BK1 to BKs shown in FIG. 6.

The compensation unit 120 compensates for the input image signal I_RGB based on the deterioration stress value STR provided from the block accumulation unit 110 and outputs the output image signal O_RGB. The output image signal O_RGB may be provided to the data lines DLI to DLm of the display panel DP shown in FIG. 3.

In an embodiment, for example, when the input image signal I_RGB corresponds to the pixel PX in the first block BK1, the compensation unit 120 may compensate for the input image signal I_RGB by using the deterioration stress value STR corresponding to the first block BK1 and may output the output image signal O_RGB corresponding to the pixel PX in the first block BK1. Likewise, when the input image signal I_RGB corresponds to the pixel PX in the second block BK2, the compensation unit 120 may compensate for the input image signal I_RGB by using the deterioration stress value STR corresponding to the second block BK2 and may output the output image signal O_RGB corresponding to the pixel PX in the second block BK2.

Figure 7:
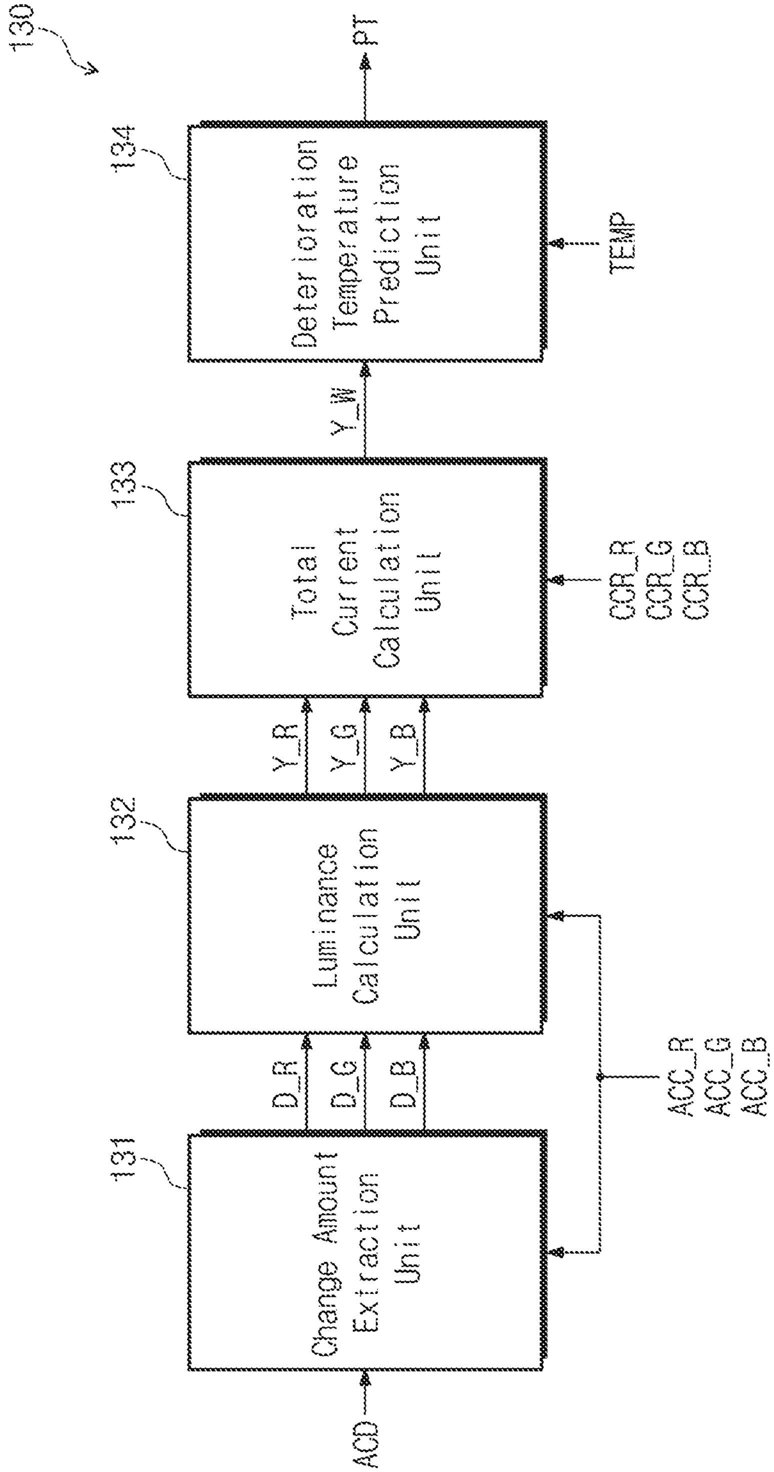
FIG. 7 is a block diagram showing a configuration of the block temperature prediction unit 130.

FIG. 7 is a block diagram showing a configuration of the block temperature prediction unit 130.

Referring to FIG. 7, the block temperature prediction unit 130 includes a change amount extraction unit 131, a luminance calculation unit 132, a total current calculation unit 133, and a deterioration temperature prediction unit 134.

The accumulation data ACD provided from the block accumulation unit 110 shown in FIG. 6 may include first color accumulation data, second color accumulation data, and third color accumulation data. In an embodiment, the first color accumulation data, the second color accumulation data, and the third color accumulation data may correspond to red, green, and blue colors, respectively. However, the present disclosure is not limited thereto. In another embodiment, for example, the accumulation data ACD may include accumulation data corresponding to various colors such as cyan, magenta, yellow, white, and the like.

The change amount extraction unit 131 extracts a first color change amount D_R, a second color change amount D_G, and a third color change amount D_B based on the accumulation data ACD.

In an embodiment, a method for the change amount extraction unit 131 to calculate the first color change amount D_R based on the accumulation data ACD is as shown in Equation 1.

$$\mathrm{D\_R} = \left(\frac{\mathrm{ACD\_R}}{255}\right)^{2.2 \times ACC\_R} \times 1024 \qquad \text{[Equation 1]}$$

In Equation 1, ACD_R denotes the first color accumulation data included in the accumulation data ACD: '255' denotes the maximum grayscale level; 2.2 denotes a gamma correction coefficient: ACC_R denotes a first color acceleration coefficient; and, '1024' denotes the maximum value of a change amount.

In an embodiment, a method for the change amount extraction unit 131 to calculate the second color change amount D_G based on the accumulation data ACD is as shown in Equation 2.

$$\mathrm{D\_G} = \left(\frac{\mathrm{ACD\_G}}{255}\right)^{2.2 \times ACC\_G} \times 1024 \qquad \text{[Equation 2]}$$

In Equation 2, ACD_G denotes the second color accumulation data included in the accumulation data ACD: '255' denotes the maximum grayscale level; 2.2 denotes a gamma correction coefficient: ACC_G denotes a second color acceleration coefficient; and, '1024' denotes the maximum value of a change amount.

In an embodiment, a method for the change amount extraction unit 131 to calculate the third color change amount D_B based on the accumulation data ACD is as shown in Equation 3.

$$\mathrm{D\_B} = \left(\frac{\mathrm{ACD\_B}}{255}\right)^{2.2 \times ACC\_B} \times 1024 \qquad \text{[Equation 3]}$$

In Equation 3, ACD_B denotes the third color accumulation data included in the accumulation data ACD; '255' denotes the maximum grayscale level; 2.2 denotes a gamma correction coefficient: ACC_B denotes a third color acceleration coefficient; and '1024' denotes the maximum value of a change amount.

The maximum grayscale level, the gamma correction value, the first to third acceleration coefficients, and the maximum value of a change amount may be changed depending on characteristics of the display panel DP.

The luminance calculation unit 132 calculates first color luminance Y_R, second color luminance Y_G, and third color luminance Y_B based on the first color change amount D_R, the second color change amount D_G, and the third color change amount D_B.

To calculate the first color luminance Y_R, the second color luminance Y_G, and the third color luminance Y_B, the luminance calculation unit 132 may use the first color acceleration coefficient ACC_R, the second color acceleration coefficient ACC_G, and the third color acceleration coefficient ACC_B. The first color acceleration coefficient ACC_R, the second color acceleration coefficient ACC_G, and the third color acceleration coefficient ACC_B quantify deterioration speeds of the pixels PX corresponding to a first color, a second color, and a third color, respectively, among the plurality of pixels PX. The first color acceleration coefficient ACC_R, the second color acceleration coefficient ACC_G, and the third color acceleration coefficient ACC_B may be values, which are obtained through the testing result after the deterioration of the pixels PX in a predetermined operating environment is test. As values of the first color acceleration coefficient ACC_R, the second color acceleration coefficient ACC_G, and the third color acceleration coefficient ACC_B increase, the deterioration speed of the pixels PX is fast.

In an embodiment, the first color acceleration coefficient ACC_R, the second color acceleration coefficient ACC_G, and the third color acceleration coefficient ACC_B may be stored in a memory (not shown) in the driving controller DC. In an embodiment, the first color acceleration coefficient ACC_R, the second color acceleration coefficient ACC_G, and the third color acceleration coefficient ACC_B may be provided from the outside (e.g., an application processor, a graphics processor, etc.).

In an embodiment, a method for the luminance calculation unit 132 to calculate the first color luminance Y_R based on the first color change amount D_R is as shown in Equation 4.

$$\mathrm{Y\_R} = \left(\frac{\mathrm{D\_R}}{1024}\right)^{(1/ACC\_R)} \times 255 \qquad \text{[Equation 4]}$$

In Equation 4, ACC_R denotes the first color acceleration coefficient; '1024' denotes the maximum value for the first color change amount; and '255' denotes the maximum grayscale value.

In an embodiment, a method for the luminance calculation unit 132 to calculate the second color luminance Y_G based on the second color change amount D_G is as shown in Equation 5.

$$\mathrm{Y\_G} = \left(\frac{\mathrm{D\_G}}{1024}\right)^{(1/ACC\_G)} \times 255 \qquad \text{[Equation 5]}$$

In Equation 5, ACC_G denotes the second color acceleration coefficient; '1024' denotes the maximum value for the second color change amount; and '255' denotes the maximum grayscale value.

In an embodiment, a method for the luminance calculation unit 132 to calculate the third color luminance Y_B based on the third color change amount D_B is as shown in Equation 6.

$$Y\_B = \left(\frac{D\_B}{1024}\right)^{(1/ACC\_B)} \times 255 \quad \text{[Equation 6]}$$

In Equation 6, ACC_B denotes the third color acceleration coefficient; '1024' denotes the maximum value for the third color change amount; and '255' denotes the maximum grayscale value.

The total current calculation unit 133 may calculate a total current Y_W based on the first color luminance Y_R, the second color luminance Y_G, and the third color luminance Y_B.

In an embodiment, the total current calculation unit 133 calculates a first current Y1 based on the first color luminance Y_R as shown in Equation 7.

$$Y1 = Y\_R \times \left(\frac{CCR\_R}{1023}\right) \quad \text{[Equation 7]}$$

In Equation 7, CCR_R denotes a first color current contribution ratio, and 1023 is the sum of current contribution ratios.

In an embodiment, the total current calculation unit 133 calculates a second current Y2 based on the second color luminance Y_G as shown in Equation 8.

$$Y2 = Y\_G \times \left(\frac{CCR\_G}{1023}\right) \quad \text{[Equation 8]}$$

In Equation 8, CCR_G denotes a second color current contribution ratio, and 1023 is the sum of current contribution ratios.

In an embodiment, the total current calculation unit 133 calculates a third current Y3 based on the third color luminance Y_B as shown in Equation 9.

$$Y3 = Y\_B \times \left(\frac{CCR\_B}{1023}\right) \quad \text{[Equation 9]}$$

In Equation 9, CCR_B denotes a third color current contribution ratio, and 1023 is the sum of current contribution ratios.

The sum of current contribution ratios means the sum of a first color current contribution ratio CCR_R, a second color current contribution ratio CCR_G, and a third color current contribution ratio CCR_B. The first color current contribution ratio CCR_R is a ratio occupied by a current, which corresponds to a first color, from among a total current flowing to the display panel DP when an image is displayed on the display panel DP. The second color current contribution ratio CCR_G is a ratio occupied by a current, which corresponds to a second color, from among the total current flowing to the display panel DP when an image is displayed on the display panel DP. The third color current contribution ratio CCR_B is a ratio occupied by a current, which corresponds to a third color, from among the total current flowing to the display panel DP when an image is displayed on the display panel DP.

In an embodiment, the first color current contribution ratio CCR_R, the second color current contribution ratio CCR_G, and the third color current contribution ratio CCR_B may be provided from a memory (not shown) in the driving controller DC. In another embodiment, the first color current contribution ratio CCR_R, the second color current contribution ratio CCR_G, and the third color current contribution ratio CCR_B may be provided from the outside (e.g., an application processor, a graphics processor, etc.).

In an embodiment, as shown in Equation 10, the total current calculation unit 133 may calculate the total current Y_W based on the average of the first current Y1, the second current Y2, and the third current Y3.

$$Y\_W = \frac{Y1 + Y2 + Y3}{3} \quad \text{[Equation 10]}$$

The deterioration temperature prediction unit 134 calculates the deterioration prediction temperature value PT based on the total current Y_W provided from the total current calculation unit 133 and the temperature signal TEMP provided from the temperature sensor TS (see FIG. 5).

A current flowing in the display panel DP is proportional to the luminance of light output from the pixel PX. Because characteristics (e.g., charge mobility) of the light emitting element ED in the pixel PX change depending on temperature, there is a desire for compensation according to the temperature. The pixel PX may be affected not only by ambient temperature but also by a temperature change according to the emission of the pixel PX.

The deterioration temperature prediction unit 134 calculates the deterioration prediction temperature value PT based on the ambient temperature (i.e., the temperature signal TEMP) detected by the temperature sensor TS and the total current Y_W corresponding to the luminance of the pixel PX. Accordingly, the deterioration compensation performance of the driving controller DC shown in FIG. 5 may be effectively improved.

In particular, because the change amount extraction unit 131 calculates a change amount based on each of the first to third color acceleration coefficients ACC_R, ACC_G, and ACC_B when calculating the luminance for the first to third color change amounts D_R, D_G, and D_B, the change amount may be accurately calculated.

Moreover, the total current calculation unit 133 obtains the first to third currents Y1, Y2, and Y3 corresponding to the first to third color luminances Y_R, Y_G, and Y_B based on the first to third color current contribution ratios CCR_R. CCR_G, and CCR_B, respectively, and then calculates the total current Y_W. After accurately calculating the current in consideration of current contribution ratios corresponding to the first color change amount D_R, the second color change amount D_G, and the third color change amount D_B, respectively, the total current calculation unit 133 obtains the total current Y_W. Accordingly, the current prediction performance of the total current calculation unit 133 may be effectively improved.

FIG. 8 is a diagram showing a total current and a predicted temperature deviation according to an image pattern.

Referring to FIGS. 5, 7, and 8, it is assumed that grayscales are 223, 255, 253 and 151 when the input image signal I_RGB corresponds to R pattern, G pattern, B pattern, and W pattern, respectively.

It is assumed that R pattern in an image displayed on the display panel DP shown in FIG. 3 is a red image pattern. In this case, a red grayscale may be 223, and each of a green grayscale and a blue grayscale may be 0.

It is assumed that G pattern in the image displayed on the display panel DP shown in FIG. 3 is a green image pattern. In this case, each of the red grayscale and the blue grayscale may be 0, and the green grayscale may be 255.

It is assumed that B pattern in the image displayed on the display panel DP shown in FIG. 3 is a blue image pattern. In this case, each of the red grayscale and the green grayscale may be 0, and the blue grayscale may be 253.

It is assumed that W pattern in the image displayed on the display panel DP shown in FIG. 3 is a white image pattern. In this case, each of the red grayscale, the green grayscale and the blue grayscale may be 151.

In FIG. 8, when R pattern, G pattern, B pattern and W pattern are displayed on the display panel DP, grayscales of 223, 255, 253 and 151 are examples of grayscales, in which currents flowing through the display panel DP are the same as one another. In other words, the actual amount of current flowing through the display panel DP at a point in time when R pattern having the red grayscale of 223 is displayed on the display panel DP is the same as the actual amount of current flowing through the display panel DP at a point in time when G pattern having the green grayscale of '255' is displayed on the display panel DP.

When the first color accumulation data ACD_R is '223', and the first color acceleration coefficient ACC_R is 1.82, the first color change amount D_R may be 599 as in Equation 1 as follows.

$$D\_R = \left(\frac{223}{255}\right)^{(2.2\times1.82)} \times 1024 = 599$$

When the second color accumulation data ACD_G is '255' and the second color acceleration coefficient ACC_G is 1.74, the second color change amount D_G may be '1024' as in Equation 2 as follows.

$$D\_G = \left(\frac{255}{255}\right)^{(2.2\times1.74)} \times 1024 = 1024$$

When the third color accumulation data ACD_B is '253' and the third color acceleration coefficient ACC_B is 1.71, the third color change amount D_B may be 994 as in Equation 3 as follows.

$$D\_B = \left(\frac{253}{255}\right)^{(2.2\times1.71)} \times 1024 = 994$$

The calculation of the first color luminance Y_R based on the first color change amount D_R by Equation 4 is as follows.

$$Y\_R = \left(\frac{599}{1024}\right)^{(1/1.82)} \times 255 = 190$$

The calculation of the second color luminance Y_G based on the second color change amount D_G by Equation 5 is as follows.

$$Y\_G = \left(\frac{1024}{1024}\right)^{(1/1.74)} \times 255 = 255$$

The calculation of the third color luminance Y_B based on the third color change amount D_R by Equation 6 is as follows.

$$Y\_B = \left(\frac{994}{1024}\right)^{(1/1.76)} \times 255 = 251$$

The calculation of the first current Y1 based on the first color luminance Y_R and the first color current contribution ratio CCR_R by Equation 7 is as follows.

$$Y1 = 190\times\left(\frac{398}{1023}\right) = 74$$

When R pattern is displayed on the display panel DP, each of the second current Y2 and the third current Y3 is 0, and thus the total current Y_W is equal to the first current Y1.

The calculation of the second current Y2 based on the second color luminance Y_G and the second color current contribution ratio CCR_G by Equation 8 is as follows.

$$Y2 = 255\times\left(\frac{306}{1023}\right) = 76$$

When G pattern is displayed on the display panel DP, each of the first current Y1 and the third current Y3 is 0, and thus the total current Y_W is equal to the second current Y2.

The calculation of the third current Y3 based on the third color luminance Y_B and the third color current contribution ratio CCR_B by Equation 9 is as follows.

$$Y3 = 251\times\left(\frac{251}{1023}\right) = 78$$

When B pattern is displayed on the display panel DP, each of the first current Y1 and the second current Y2 is 0, and thus the total current Y_W is equal to the third current Y3.

When each of the first color accumulation data ACD_R, the second color accumulation data ACD_G, and the third color accumulation data ACD_B of the accumulation data ACD for W pattern is 151, the first color acceleration coefficient ACC_R is 1.82, the second color acceleration coefficient ACC_G is 1.74, and the third color acceleration coefficient ACC_B is 1.71, the first color change amount D_R, the second color change amount D_G, and the third color change amount D_B calculated by Equation 1, Equation 2, and Equation 3 are 126, 138, and 143, respectively.

The first color luminance Y_R, the second color luminance Y_G, and the third color luminance Y_B are calculated as 80, 80, and 80 based on the first color change amount D_R, the second color change amount D_G and the third color change amount D_B for W pattern according to Equation 4, Equation 5, and Equation 6, respectively.

When R pattern, G pattern, B pattern, and W pattern are displayed on the display panel DP, the total current Y_W indicates a prediction value calculated by the block temperature prediction unit 130.

In FIG. 8, when R pattern, G pattern, B pattern and W pattern are displayed on the display panel DP, grayscales of 223, 255, 253 and 151 are examples of grayscales, in which currents flowing through the display panel DP are the same as one another. When R pattern, G pattern, B pattern, and W pattern, which have the same currents as one another, are displayed on the display panel DP, the total current Y_W calculated by the block temperature prediction unit 130 may be similarly calculated as 74, 76, 78, and 80.

Moreover, a ratio of the total current Y_W at a point in time when each of R pattern, G pattern, and B pattern is displayed on the display panel DP and the total current Y_W at a point in time when W pattern is displayed on the display panel DP is close to 1.

In the example shown in FIG. 8, because the total current Y_W at a point in time when each of R pattern, G pattern, and B pattern is displayed on the display panel DP is similar to the total current Y_W at a point in time when W pattern is displayed on the display panel DP, temperature deviations in the block temperature prediction unit 130 are similar to each other.

There may be a temperature deviation between temperature, which is detected by the temperature sensor TS and depends on an image displayed on the display panel DP, and actual temperature of the display panel DP. The deterioration temperature prediction unit 134 in the block temperature prediction unit 130 predicts a temperature deviation based on the predicted total current Y_W and calculates the deterioration prediction temperature value PT based on the predicted temperature deviation and the temperature signal TEMP provided from the temperature sensor TS. In an embodiment, the deterioration temperature prediction unit 134 may output a difference between the temperature signal TEMP and the predicted temperature deviation as the deterioration prediction temperature value PT.

As shown in FIG. 7, the luminance calculation unit 132 of the block temperature prediction unit 130 may calculate the first color luminance Y_R, the second color luminance Y_G, and the third. The color luminance Y_B corresponding to the first color change amount D_R, the second color change amount D_G, and the third color change amount D_B by using the first color acceleration coefficient ACC_R, the second color acceleration coefficient ACC_G and the third color acceleration coefficient ACC_B, respectively. Accordingly, characteristics of the first color, second color, and third color may be reflected to the first color luminance Y_R, the second color luminance Y_G, and the third color luminance Y_B, respectively.

Furthermore, the total current calculation unit 133 of the block temperature prediction unit 130 may calculate the first current Y1, the second current Y2 and the third current Y3 corresponding to the first color luminance Y_R, the second color luminance Y_G, and the third color luminance Y_B by using the first color current contribution ratio CCR_R, the second color current contribution ratio CCR_G and the third color current contribution ratio CCR_B, respectively, and then may calculate the total current Y_W. Because current contribution ratios of a first color, a second color, and a third color may be reflected to the first current Y1, the second current Y2, and the third current Y3, respectively, the total current Y_W may be calculated similarly to the actual current.

In particular, when there is a great difference between the first color accumulation data ACD_R, the second color accumulation data ACD_G, and the third color accumulation data ACD_B included in the accumulation data ACD, the first color luminance Y_R, the second color luminance Y_G, and the third color luminance Y_B may be calculated by using the first color acceleration coefficient ACC_R, the second color acceleration coefficient ACC_G, and the third color acceleration coefficient ACC_B. Accordingly, the accuracy of temperature deviation prediction may be effectively improved.

Figure 9:
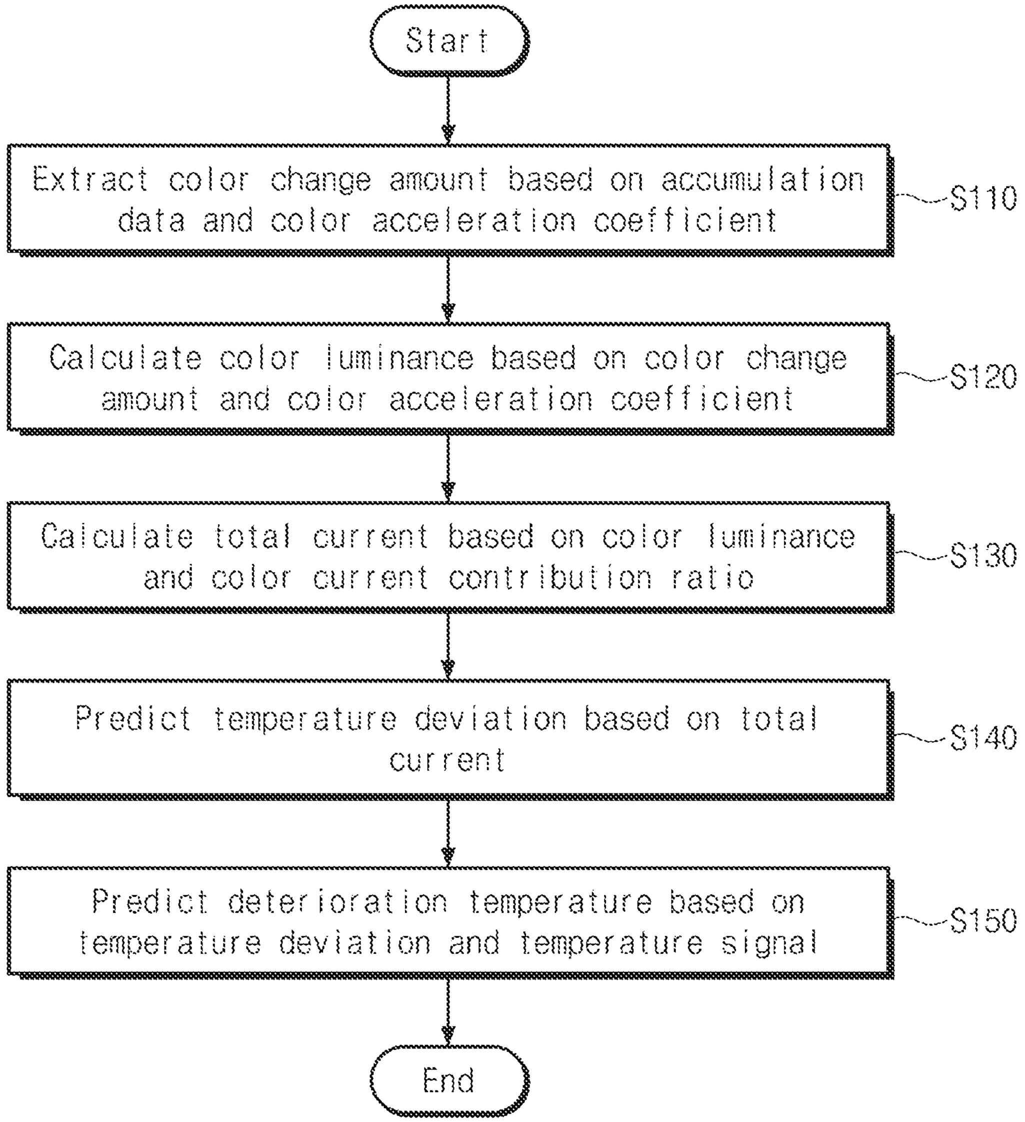
FIG. 9 is a flowchart showing a deterioration temperature predicting method of a display device, according to an embodiment of the present disclosure.

FIG. 9 is a flowchart showing a deterioration temperature predicting method of a display device, according to an embodiment of the present disclosure.

Referring to FIGS. 7 and 9, the change amount extraction unit 131 extracts a color change amount based on the accumulation data ACD and a color acceleration coefficient (operation S110).

When the accumulation data ACD includes the first color accumulation data ACD_R, the second color accumulation data ACD_G, and the third color accumulation data ACD_B, the change amount extraction unit 131 may calculate the first color change amount D_R, the second color change amount D_G, and the third color change amount D_B corresponding to the first color accumulation data ACD_R, the second color accumulation data ACD_G, and the third color accumulation data ACD_B, by using the first color acceleration coefficient ACC_R, the second color acceleration coefficient ACC_G, and the third color acceleration coefficient ACC_B, respectively.

The luminance calculation unit 132 calculates color luminance based on the color change amount and the color acceleration coefficient (operation S120).

In the example shown in FIG. 7, the color change amount output from the change amount extraction unit 131 includes the first color change amount D_R, the second color change amount D_G, and the third color change amount D_B. In this case, to calculate the first color luminance Y_R, the second color luminance Y_G and the third color luminance Y_B corresponding to the first color change amount D_R, the second color change amount D_G and the third color change amount D_B, the luminance calculation unit 132 may use the first color acceleration coefficient ACC_R, the second color acceleration coefficient ACC_G, and the third color acceleration coefficient ACC_B.

The total current calculation unit 133 calculates the total current Y_W based on color luminance and color current contribution ratio (operation S130).

In the example shown in FIG. 7, the color luminance output from the luminance calculation unit 132 includes the first color luminance Y_R, the second color luminance Y_G, and the third color luminance Y_B. In this case, the total current calculation unit 133 calculates the first current Y1, the second current Y2, and the third current Y3 corresponding to the first color luminance Y_R, the second color luminance Y_G, and the third color luminance Y_B based on the first color current contribution ratio CCR_R, the second color current contribution ratio CCR_G and the third color current contribution ratio CCR_B, respectively.

The deterioration temperature prediction unit 134 predicts a temperature deviation based on the total current Y_W (operation S140).

The deterioration temperature prediction unit 134 predicts deterioration temperature based on the temperature deviation and the temperature signal provided from the temperature sensor TS (operation S150).

A display device having such a configuration may accurately predict the deterioration temperature of a pixel based on an input image signal. Accordingly, the display device may accurately compensate for the deterioration of a pixel based on the predicted deterioration temperature.

As used in connection with various embodiments of the disclosure, the term “unit” may be implemented in hardware, software, or firmware, and may be interchangeably used with other terms, for example, “logic,” “logic block,” “part,” or “circuitry”. A unit may be a single integral component, or a minimum unit or part thereof, adapted to perform one or more functions. For example, according to an embodiment of the disclosure, the unit may be implemented in a form of an application-specific integrated circuit (ASIC).

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

What is claimed is:

1. An operating method of a display device for outputting an output image signal based on an input image signal and a temperature signal, the method comprising:

extracting a color change amount based on accumulation data, which is calculated based on the input image signal, and a color acceleration coefficient;

calculating color luminance based on the color change amount and the color acceleration coefficient;

calculating a total current based on the color luminance and a color current contribution ratio;

calculating a temperature deviation based on the total current; and calculating a deterioration prediction temperature value based on the temperature deviation and a temperature signal from a temperature sensor.

2. The method of claim 1, wherein the accumulation data includes first color accumulation data, second color accumulation data, and third color accumulation data, wherein the color acceleration coefficient includes a first color acceleration coefficient, a second color acceleration coefficient, and a third color acceleration coefficient, and wherein the extracting of the color change amount includes:

calculating a first color change amount based on the first color accumulation data and the first color acceleration coefficient;

calculating a second color change amount based on the second color accumulation data and the second color acceleration coefficient; and calculating a third color change amount based on the third color accumulation data and the third color acceleration coefficient.

3. The method of claim 2, wherein the calculating of the color luminance includes:

calculating first color luminance based on the first color change amount and the first color acceleration coefficient;

calculating second color luminance based on the second color change amount and the second color acceleration coefficient; and calculating third color luminance based on the third color change amount and the third color acceleration coefficient.

4. A driving controller comprising:

an accumulation unit configured to output accumulation data and a deterioration stress value based on an input image signal and a deterioration prediction temperature value;

a temperature prediction unit configured to calculate the deterioration prediction temperature value based on the accumulation data, a color acceleration coefficient, a color current contribution ratio, and a temperature signal; and a compensation unit configured to output an output image signal based on the input image signal and the deterioration stress value, wherein the temperature prediction unit extracts a color change amount based on the accumulation data and the color acceleration coefficient, calculates color luminance based on the color change amount and the color acceleration coefficient, calculates a total current based on the color luminance and a color current contribution ratio, and calculates the deterioration prediction temperature value based on the total current and the temperature signal.

5. The driving controller of claim 4, wherein the temperature prediction unit includes:

a change amount extraction unit configured to extract the color change amount based on the accumulation data and the color acceleration coefficient;

a luminance calculation unit configured to calculate the color luminance based on the color change amount and the color acceleration coefficient;

a total current calculation unit configured to calculate the total current based on the color luminance and the color current contribution ratio; and a deterioration temperature prediction unit configured to calculate the deterioration prediction temperature value based on the total current and the temperature signal.

6. The driving controller of claim 5, wherein the accumulation data includes first color accumulation data, second color accumulation data, and third color accumulation data, wherein the color acceleration coefficient includes a first color acceleration coefficient, a second color acceleration coefficient, and a third color acceleration coefficient, and wherein the change amount extraction unit calculates a first color change amount based on the first color accumulation data and the first color acceleration coefficient, calculates a second color change amount based on the second color accumulation data and the second color acceleration coefficient, and calculates a third color change amount based on the third color accumulation data and the third color acceleration coefficient.

7. The driving controller of claim 6, wherein the luminance calculation unit calculates first color luminance based on the first color change amount and the first color acceleration coefficient, calculates second color luminance based on the second color change amount and the second color acceleration coefficient, and calculates third color luminance based on the third color change amount and the third color acceleration coefficient.

8. The driving controller of claim 7, wherein the color current contribution ratio includes a first color current contribution ratio, a second color current contribution ratio, and a third color current contribution ratio, wherein the total current calculation unit calculates a first current based on the first color luminance and the first color current contribution ratio, calculates a second current based on the second color luminance and the second color current contribution ratio, and calculates a third current based on the third color luminance and the third color current contribution ratio, and wherein the total current calculation unit calculates the total current based on the first current, the second current, and the third current.

9. The driving controller of claim 8, wherein the total current calculation unit calculates an average of the first current, the second current, and the third current as the total current.

10. The driving controller of claim 5, wherein the deterioration temperature prediction unit predicts a temperature deviation based on the total current and calculates the deterioration prediction temperature value based on the predicted temperature deviation and the temperature signal.

11. A display device comprising:

a display panel including a plurality of pixels divided into a plurality of blocks;

a temperature sensor configured to sense ambient temperature and to output a temperature signal corresponding to the sensed ambient temperature; and a driving controller configured to receive an input image signal and the temperature signal, and provide an output image signal obtained by compensating for the input image signal based on the input image signal and the temperature signal to the display panel, wherein the driving controller includes:

a block accumulation unit configured to output accumulation data and a deterioration stress value of each of the plurality of blocks based on the input image signal and a deterioration prediction temperature value;

a block temperature prediction unit configured to calculate the deterioration prediction temperature value based on the accumulation data, a color acceleration coefficient, a color current contribution ratio, and the temperature signal; and a compensation unit configured to output the output image signal based on the input image signal and the deterioration stress value.

12. The display device of claim 11, wherein the block temperature prediction unit includes:

a change amount extraction unit configured to extract a color change amount based on the accumulation data and the color acceleration coefficient;

a luminance calculation unit configured to calculate color luminance based on the color change amount and the color acceleration coefficient;

a total current calculation unit configured to calculate a total current based on the color luminance and a color current contribution ratio; and a deterioration temperature prediction unit configured to calculate the deterioration prediction temperature value based on the total current and the temperature signal.

13. The display device of claim 12, wherein the deterioration temperature prediction unit predicts a temperature deviation based on the total current and calculates the deterioration prediction temperature value based on the predicted temperature deviation and the temperature signal.

14. The display device of claim 12, wherein the accumulation data includes first color accumulation data, second color accumulation data, and third color accumulation data, wherein the color acceleration coefficient includes a first color acceleration coefficient, a second color acceleration coefficient, and a third color acceleration coefficient, and wherein the change amount extraction unit calculates a first color change amount based on the first color accumulation data and the first color acceleration coefficient, calculates a second color change amount based on the second color accumulation data and the second color acceleration coefficient, and calculates a third color change amount based on the third color accumulation data and the third color acceleration coefficient.

15. The display device of claim 14, wherein the change amount extraction unit calculates the first color change amount based on Equation 1:

$$D\_R = \left(\frac{ACD\_R}{255}\right)^{2.2 \times ACC\_R} \times 1024, \quad \text{[Equation 1]}$$

and where D_R denotes the first color change amount, ACD_R denotes the first color accumulation data, ACC_R denotes the first color acceleration coefficient, 2.2 denotes a gamma correction coefficient, 255 denotes a maximum grayscale value, and 1024 denotes a maximum value of the first color change amount.

16. The display device of claim 14, wherein the luminance calculation unit calculates first color luminance based on the first color change amount and the first color acceleration coefficient, calculates second color luminance based on the second color change amount and the second color acceleration coefficient, and calculates third color luminance based on the third color change amount and the third color acceleration coefficient.

17. The display device of claim 16, wherein the luminance calculation unit calculates the first color luminance based on Equation 2:

$$Y\_R = \left(\frac{D\_R}{1024}\right)^{(1/ACC\_R)} \times 255, \quad \text{[Equation 2]}$$

and where Y_R denotes the first color luminance, D_R denotes the first color change amount, ACC_R denotes the first color acceleration coefficient, 1024 denotes a maximum value of the first color change amount, and 255 denotes a maximum grayscale value.

18. The display device of claim 16, wherein the color current contribution ratio includes a first color current contribution ratio, a second color current contribution ratio, and a third color current contribution ratio, wherein the total current calculation unit calculates a first current based on the first color luminance and the first color current contribution ratio, calculates a second current based on the second color luminance and the second color current contribution ratio, and calculates a third current based on the third color luminance and the third color current contribution ratio, and wherein the total current calculation unit calculates the total current based on the first current, the second current, and the third current.

19. The display device of claim 18, wherein the total current calculation unit calculates the first current based on Equation 3:

$$Y1 = \text{Y\_R} \times \left(\frac{\text{CCR\_R}}{1023}\right), \quad \text{[Equation 3]}$$

and where Y1 denotes the first current, Y_R denotes the first color luminance, CCR_R denotes the first color current contribution ratio, and 1023 is a sum of the first color current contribution ratio, the second color current contribution ratio and the third color current contribution ratio.

20. The display device of claim 18, wherein the total current calculation unit calculates an average of the first current, the second current, and the third current as the total current.

* * * * *